(12) United States Patent
Narla

(10) Patent No.: US 10,381,838 B2
(45) Date of Patent: Aug. 13, 2019

(54) POWER CONTROL SYSTEM WITH FAULT DETECTION AND DATA RETENTION FOR ENERGY GENERATION SYSTEMS

(71) Applicant: SolarCity Corporation, San Mateo, CA (US)

(72) Inventor: Sandeep Narla, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 477 days.

(21) Appl. No.: 15/151,367

(22) Filed: May 10, 2016

(65) Prior Publication Data

US 2017/0331293 A1    Nov. 16, 2017

(51) Int. Cl.
  *H02J 3/38*   (2006.01)
  *H02J 7/35*   (2006.01)
  *H02M 1/00*   (2006.01)

(52) U.S. Cl.
  CPC .............. *H02J 3/383* (2013.01); *H02J 3/385* (2013.01); *H02J 7/35* (2013.01); *H02M 2001/0006* (2013.01); *Y02B 10/14* (2013.01); *Y02E 10/563* (2013.01); *Y02E 10/566* (2013.01); *Y02E 10/58* (2013.01)

(58) Field of Classification Search
  CPC .... H02J 3/383; H02J 3/38; H02J 3/385; H02J 7/35; H02M 3/04; H02M 7/44; H02M 2001/0006
  See application file for complete search history.

(56) References Cited

U.S. PATENT DOCUMENTS

| 5,960,035 | A | * | 9/1999 | Sridhar ................. H04L 5/1446 375/219 |
|---|---|---|---|---|
| 8,300,439 | B2 | | 10/2012 | Little et al. |
| 8,365,018 | B2 | | 1/2013 | McIntosh et al. |
| 8,645,937 | B2 | | 2/2014 | Angerer et al. |
| 9,019,673 | B2 | | 4/2015 | Varma et al. |
| 2001/0048605 | A1 | * | 12/2001 | Kurokami ............. H02J 7/0052 363/56.03 |
| 2001/0049263 | A1 | | 12/2001 | Zhang |
| 2009/0160259 | A1 | * | 6/2009 | Naiknaware ........ H02M 7/4807 307/82 |
| 2011/0249475 | A1 | * | 10/2011 | Fujii ...................... H02H 7/122 363/50 |
| 2012/0239319 | A1 | * | 9/2012 | Singh ..................... G01R 31/42 702/58 |
| 2014/0266288 | A1 | | 9/2014 | Trabacchin et al. |
| 2014/0304699 | A1 | | 10/2014 | He et al. |
| 2015/0194801 | A1 | | 7/2015 | Schripsema |

FOREIGN PATENT DOCUMENTS

| WO | 2014171932 A1 | 10/2014 |
|---|---|---|
| WO | 2015049393 A1 | 4/2015 |
| WO | 2015065291 A1 | 5/2015 |
| WO | 2015106800 A1 | 7/2015 |

* cited by examiner

*Primary Examiner* — Jared Fureman
*Assistant Examiner* — Emmanuel Dominique
(74) *Attorney, Agent, or Firm* — Kilpatrick Townsend & Stockton LLP

(57) ABSTRACT

A programmable microcontroller and a non-volatile memory are coupled to monitor and store operating parameters associated with operation of a power control system for a power generation system. The microcontroller is programmed to respond to a fault event (i.e., an anomalous condition that exceeds a threshold value) by storing the operating parameters before, during and after the fault event in the non-volatile memory.

17 Claims, 12 Drawing Sheets

POWER CONTROL SYSTEM WITH FAULT DETECTION AND DATA RETENTION FOR ENERGY GENERATION SYSTEMS

FIELD

The described embodiments relate generally to energy generation systems. More particularly, the present embodiments relate to power control systems (PCS) that include one or more microcontroller for monitoring one or more operating parameters of a photovoltaic (PV) energy generation system and for detecting a fault event associated with the operation of the energy generation system. The one or more microcontrollers are also configured to store PCS operational data in a non-volatile memory for later recall and analysis to determine the cause of the fault event.

BACKGROUND

Photovoltaic or "solar" power systems are becoming increasingly popular with consumers, businesses and utility companies due to decreasing hardware costs, state and federal tax incentives, and increased evidence and awareness of the correlation between $CO_2$ emissions and climate change. A basic solar power system consists of an array of solar panels connected together in one or more strings, a combiner for combining the outputs of the one or more strings, one or more string inverters for converting the combined direct current (DC) output from the strings to alternating current (AC), and a physical interface to AC grid power—typically on the load side of the utility meter, between the meter and the customer's main electric panel. Some energy generation systems may have energy storage devices (e.g., batteries) and are utilized to store DC energy from a PV array or AC grid and to delivery energy to an AC grid or back-up loads. A power control system could be an inverter or one or more PV module based power electronics blocks (e.g., optimizers, micro-inverters and the like).

Since many solar systems are initially paid for by money borrowed from investment banks, a solar system with high reliability (percent uptime) is preferred and easier to get approved by the financier. One factor affecting the reliability of solar power systems is "nuisance shutdowns" or "failures". Nuisance shutdowns are typically caused by fluctuations in the power grid or other innocuous causes that result in the solar system being immediately and unexpectedly shut down. Other times, shut downs are the result of the failure of one of the components of the solar energy generation system. To maximize the reliability of these systems, the root cause of the shutdown or failure must be identified early and resolved quickly without going through time-consuming site investigations or vendor RMA processes while the array remains non-functional. Further, from the limited evidence available, it is often difficult to determine the root cause of an unexpected shutdown and it may be left unresolved. Consequently, the inability to identify the root cause may result in more fault events further reducing the reliability of the solar power system.

SUMMARY

Some embodiments of the present disclosure relate to an energy generation system having a photovoltaic array coupled through a power control system to an AC distribution panel. In this embodiment, a programmable microcontroller and a non-volatile memory are coupled to one or more of the energy generation system electronic components and are configured to acquire and monitor operating parameters of the system. The microcontroller is programmed to respond to a fault event (i.e., an anomalous condition that exceeds a threshold value) by storing the operating parameters before, during and after the fault event in the non-volatile memory. The stored data can be retrieved later or in real time either by directly downloading it from the memory or through remote telecommunications (wired or wireless). This data can then be used to facilitate the determination of the root cause of the fault event and any associated shutdown of the solar system. The microcontroller and memory may be powered by redundant sources of power so they remain operational even if one of more of the sources of power become unavailable.

Some embodiments relate to a power control system for an energy generation system, the power control system comprising a DC to DC converter configured to convert power generated by an energy generation source. A DC to AC inverter is configured to convert DC power output by the DC to DC converter to AC power and a plurality of sensors are coupled to the DC to DC converter and the DC to AC inverter, each sensor being configured to detect and generate operational parameter data associated with the operation of the power control system. A microcontroller is configured to acquire and analyze the operational parameter data generated by each sensor to determine whether a fault event has occurred, and a non-volatile memory is coupled to the microcontroller. A predetermined amount of time after the microcontroller detects the occurrence of a fault event based on operational parameter data acquired from a first sensor, a predetermined amount of operational parameter data is stored in the non-volatile memory, the predetermine amount of operational parameter data including operational parameter data generated by the first sensor before, during and after the fault event.

In some embodiments the fault event is created when operational parameter data generated by one or more of the plurality of sensors exceeds an associated threshold value. In various embodiments the plurality of sensors includes two or more sensors selected from the group consisting of a current sensor, a voltage sensor and a temperature sensor. In further embodiments the predetermined amount operational parameter data stored in the non-volatile memory includes operational parameter data generated by two or more sensors before, during and after the fault event.

In some embodiments the power control system further comprising a first-in-first-out buffer configured to temporarily store a moving time window of operational parameter data generated by each of the plurality of sensors. In various embodiments after a predetermined period of time after detecting the fault event, the microcontroller instructs the first-in-first-out buffer to transfer data stored therein to the non-volatile memory, the data transferred to the non-volatile memory including the moving time window of operational parameter data generated by the first sensor starting a predetermined amount of time before and ending a predetermined amount of time after the microcontroller detects the occurrence of the fault event.

In some embodiments the power control system further comprises an auxiliary power supply coupled to receive power from any one of a photovoltaic array, a battery pack, and the AC grid, and to supply power to the microcontroller and the non-volatile memory. A back-up battery can be used to power the microcontroller and the non-volatile memory when the photovoltaic array, the battery pack and the AC grid are not available to provide power to the auxiliary power supply.

In some embodiments the DC to DC converter has input terminals adapted to be coupled to power lines on which power is generated by a photovoltaic array. The DC to AC inverter has terminals adapted to be coupled to the AC grid, and the power control system includes terminals adapted to be coupled to a battery pack, wherein the operational parameter data generated by the plurality of sensors includes voltage and current data acquired at the input terminals of the DC to DC converter, at the terminals of the DC to AC inverter, and at the terminals of the power control system that are adapted to be coupled to the battery pack.

In some embodiments the power control system further comprises a communication channel for transmitting the operational parameter data stored in the non-volatile memory to a remote location. In various embodiments the power control system is configured to receive, via the communication channel, one or more commands from the remote location, responsive to the fault event. In further embodiments one or more sensors are coupled to a battery and AC back-up loads, each of the one or more sensors configured to detect and generate operational parameter data associated with operation of the battery and the AC back-up loads.

In some embodiments a power control system for an energy generation system comprises a DC to DC converter configured to receive DC power from at least one solar photovoltaic panel, a DC to AC inverter configured to receive DC power from the DC to DC converter and convert the DC power to AC power for injection into an AC mains and a plurality of sensors coupled to the DC to DC converter and the DC to AC inverter, each sensor being configured to detect and generate operational parameter data associated with the operation of the power control system. A microcontroller is configured to simultaneously compare operational parameter data received from each of the plurality of sensors with an associated one of a plurality of threshold values to determine whether operational parameter data generated by each of the plurality of sensors has exceed the associated threshold value. A buffer is configured to temporarily store a moving time window of operational parameter data generated by each of the plurality of sensors. A non-volatile memory is coupled to the buffer, wherein a predetermined amount of time after the microcontroller detects that operational parameter data generated by a first sensor has exceeded an associated threshold value, data stored in the buffer is transferred to the non-volatile memory, the data transferred to the non-volatile memory including a moving time window of operational parameter data generated by the first sensor starting a predetermined amount of time before and ending a predetermined amount of time after the microcontroller detects that operational parameter data generated by the first sensor has exceeded an associated threshold value.

In some embodiments an auxiliary power supply is coupled to receive power from any one of a photovoltaic array, a battery pack, and the AC grid, and to supply power to the microcontroller and the non-volatile memory. A back-up battery is used for powering the non-volatile memory and the microcontroller when the photovoltaic array, the battery pack and the AC grid are not available to provide power to the auxiliary power supply. In various embodiments the power control system is configured to transmit the data transferred from the first-in-first-out buffer to the non-volatile memory to a remote location, and in response, receive one or more operational commands from the remote location.

In some embodiments the data transferred from the buffer to the non-volatile memory further includes a moving time window of operational parameter data generated by a second sensor starting a predetermined amount of time before and ending a predetermined amount of time after the microcontroller detects that operational parameter data generated by the first sensor has exceeded an associated threshold value. In various embodiments the DC to DC converter has input terminals adapted to be coupled to power lines on which power is generated by the at least one solar photovoltaic panel, the DC to AC inverter has terminals adapted to be coupled to the AC mains, and the power control system includes terminals adapted to be coupled to a battery pack, wherein the operational parameter data generated by the plurality of sensors includes voltage and current data acquired at the input terminals of the DC to DC converter, at the terminals of the DC to AC inverter, and at the terminals of the power control system that are adapted to be coupled to the battery pack.

In some embodiments a method of operating a power control system for use in an energy generation system comprises receiving operational parameter data generated by each of a plurality of sensors coupled to a DC to DC converter and to a DC to AC inverter and comparing the operational parameter data generated by each sensor to an associated one of a plurality of threshold values. A fault event is created when the operational parameter data generated by a first one of the plurality of sensors exceeds its associated threshold value, and a predetermined amount of time after creating the fault event, operational parameter data is stored in a non-volatile memory, the operational parameter data generated by the first one of the plurality of sensors during a time window starting a predetermined amount of time before and ending a predetermined amount of time after the fault event is created.

In some embodiments a moving time window of operational parameter data generated by each of the plurality of sensors is temporarily stored in a buffer and a period of time after creating the fault event, a moving time window of operational parameter data generated by the first one of the plurality of sensors is transferred from the buffer to the non-volatile memory. In various embodiments the moving time window of operational parameter data stored in the non-volatile memory is transmitted to a remote location for analysis of the data. In further embodiment s after transmitting the moving time window of operational parameter data to a remote location, a command is received from the remote location to reset the power control system.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
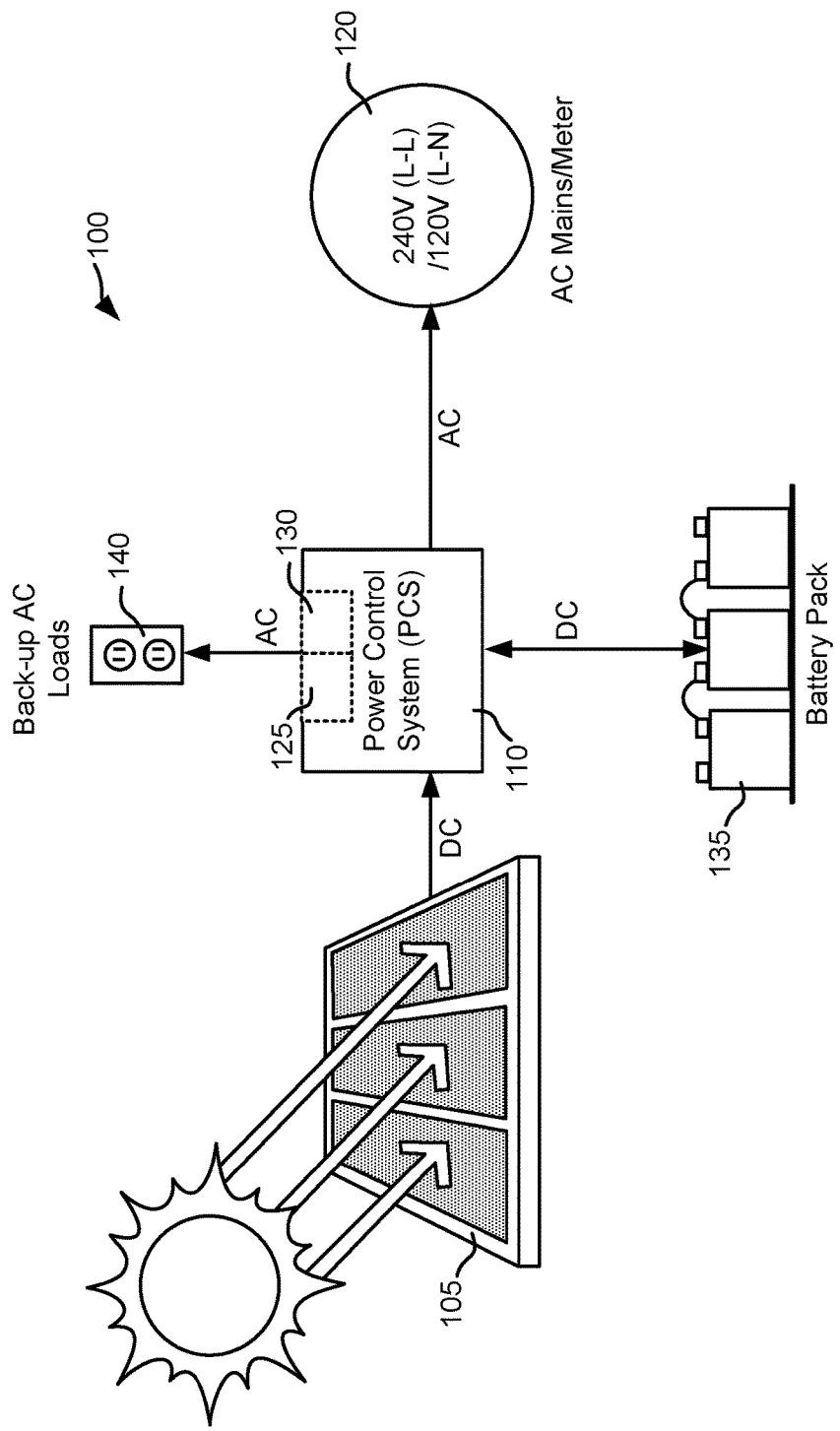
FIG. 1 is a simplified illustration of a photovoltaic power generation system according to an embodiment of the disclosure.

Some embodiments of the present disclosure relate to microcontrollers that are integrated within energy generation systems to monitor and record one or more operating parameters of the energy generation system. In such embodiments, the microcontroller is configured to identify one or more fault events that may be associated with an unplanned shut down of the energy generation system and to store the operating parameters before, during and after the fault event in a memory for later recall to assist in determining the cause of the one or more fault events. While the present disclosure can be useful for a wide variety of configurations, some embodiments of the disclosure are particularly useful for PV systems that are installed on residential or commercial buildings, as described in more detail below.

For example, in some embodiments, a PV power control system converts DC energy received from PV panels into AC energy for injection into an AC grid or "AC mains." The power control system can include a DC-to-DC converter and a DC-to-AC inverter, and a number of sensor circuits for detecting operating parameters such as, for example, input/output voltages, input/output currents, switching frequencies, spectrum noise, ground current and temperatures to name a few. A microcontroller continuously acquires and analyzes data from the sensors to determine whether a fault event has occurred. If the microcontroller detects a fault event based on data acquired from, for example, a first sensor, a predetermined amount of time after detection of the of the fault event, data generated by the first sensor before, during and after the fault event is stored in the non-volatile memory. Data generated by other sensors during the same time period may also be stored in the non-volatile memory. Further, data for more than one fault can be stored in the non-volatile memory, under a multiple fault events scenario.

In one exemplary embodiment, a moving time window of operational data generated by each sensor is stored in a temporary buffer, such as, for example, a first-in-first-out buffer. The microcontroller continuously monitors operational data generated by each sensor to determine if an associated threshold value has been exceeded. If, the operational data generated by a first sensor exceeds its associated threshold value, the microcontroller identifies it as a fault event and then, in a predetermined time period after the fault event, the microcontroller transfers the moving time window of operational data generated by the first sensor from the temporary buffer to the non-volatile memory. The moving time window of operational data that is transferred to the non-volatile memory corresponds to a time period starting a predetermined amount of time before and ending a predetermined amount of time after the fault event. The moving time window of operational data generated by other sensors during the same time period may also be transferred from the buffer to the non-volatile memory at the same time. The operational data stored in the non-volatile memory can be later recalled through a remote or direct connection for analysis of the fault event to assist in the determination of the root cause of the failure and mitigation of future occurrences. The remote connection can be a wired (RS-485, Modbus, RS-232, CAN and the like) or a wireless (power line communication, Wi-Fi, Zigbee, radio and the like) communication channel and can enable remotely restarting the system. Additionally, the remote location can send new operating parameters or firmware itself for at least one or more components of the power control system to mitigate future shut downs of the system (i.e., a bug fix) to improve the reliability.

In various embodiments, the microcontroller and the memory may be powered by one or more auxiliary backup power supplies to ensure that they can operate even though the solar PV system may be unavailable, shut off or severely damaged. The microcontroller and memory may be configured to identify and record a plurality of fault events.

In order to better appreciate the features and aspects of PV control systems with integrated data acquisition and storage capabilities according to the present disclosure, further context for the disclosure is provided next by discussing one particular implementation of a monitoring and recording system according to embodiments of the present disclosure. These embodiments are exemplary only and other configurations and recording methods can be employed in other PV systems without departing from the spirit and scope of this disclosure.

FIG. 1 illustrates a system diagram of an exemplary solar power generation system 100 according to various embodiments disclosed herein. One or more PV panels 105 are oriented towards the sun and generate DC energy that is input into a power control system (PCS) 110. Typically, though not necessarily, several PV panels are wired together in series forming a high voltage string. PV panels 105 can be arranged in a plurality of strings with each string connected in parallel for an additive DC current, at a voltage of, for example, between 10 and 2000 volts. The voltage rating of the panels not withstanding, the actual voltage output will depend on factors such as the number of PV panels, their efficiency, their output rating, ambient temperature and irradiation on each panel.

PCS 110 is used to convert the DC energy received from PV panels 105 to AC energy that is delivered to an AC Mains 120. PCS 110 can be equipped with one or more DC-to-DC converters and one or more DC-to-AC inverters, as discussed in more detail below.

In some embodiments, PCS 110 can also include microcontroller 125 that is coupled to various circuits within PCS 110 using data acquisition lines to acquire one or more operating parameters from PCS 110. For example, microcontroller 125 can be configured to monitor DC voltage and current from PV panels 105, AC voltage and current delivered to AC mains/meter 120, a switching frequency of an internal DC-to-AC inverter, a temperature of an integrated circuit or a temperature of an ambient environment within PCS 110 using appropriate sensors. Microcontroller 125 is configured to identify fault events by analyzing operational data generated by each sensor to determine if the operational data generated by a given sensor exceeds a predetermined threshold value associated with the sensor measurement. For example, if the AC voltage delivered to AC mains/meter 120 exceeds an allowable voltage threshold, microcontroller 125 would identify this condition as a fault event. Fault events may be associated with conditions that cause the PCS to automatically shut down solar energy generation system 100. When a fault event is identified, the microcontroller stores operating parameter data for a period of time before, during and after the fault event in non-volatile memory 130. The operating parameter data can be later recalled to assist in determining the cause of the fault event, as discussed in more detail below.

In some embodiments solar energy generation system 100 will also include an energy storage device also referred as battery pack 135 for storing electrical energy from PV panels 105 or from the AC grid, and to supply power to one or more back-up loads 140 when PV panels 105 and/or the AC grid are not available. AC mains/meter 120 can be used to supply AC power to AC loads 140 when PCS 110 is not receiving power from PV panels 105 or battery pack 135.

Figure 2:
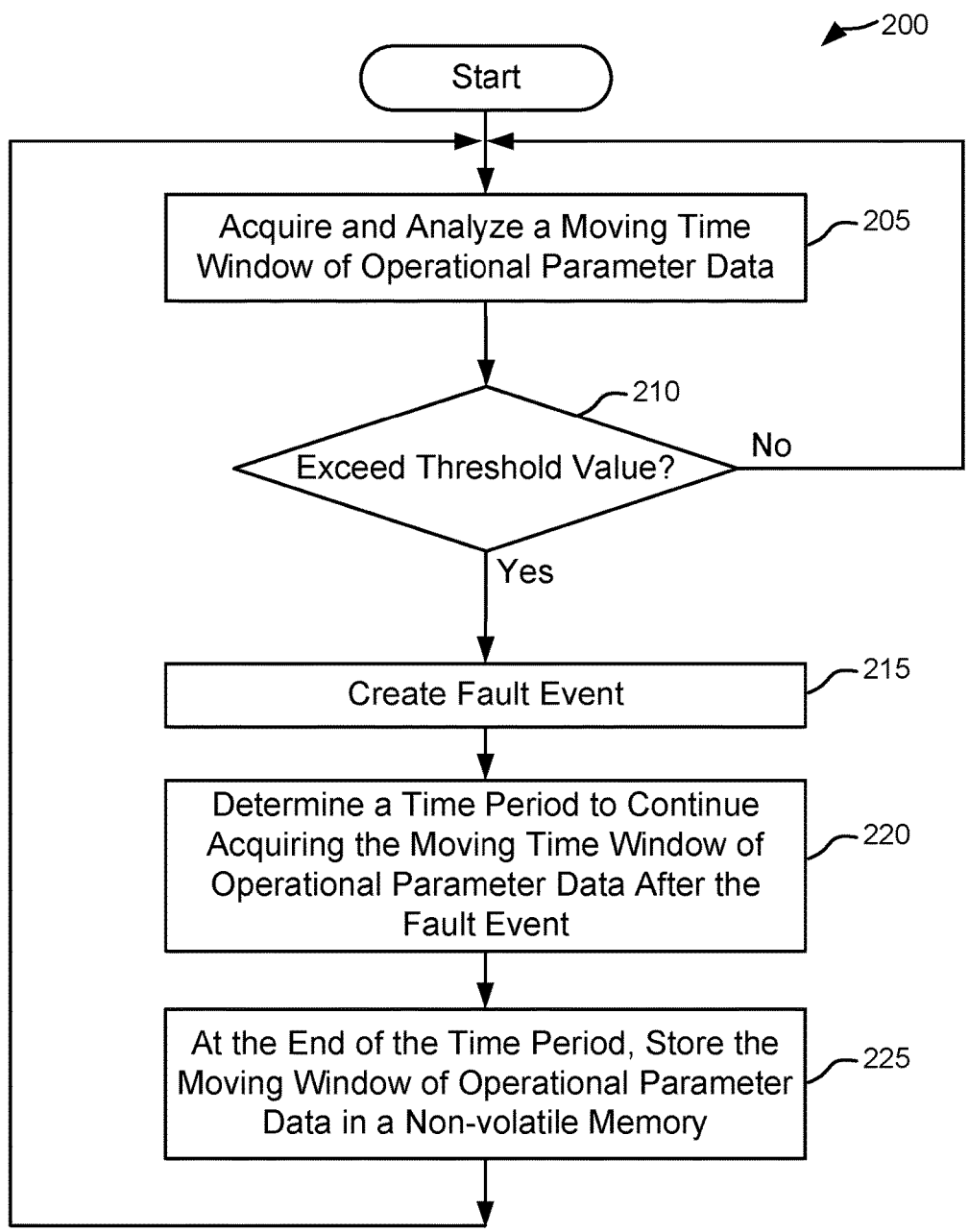
FIG. 2 is a flowchart showing the steps of a process for acquiring, analyzing and storing operational parameter data related to one or more components of the power control system shown in FIG. 1.

FIG. 2 is an exemplary process 200 for detecting a fault event and storing operating parameter data in non-volatile memory 130, according to some embodiments of the disclosure. In step 205 microcontroller 125 acquires and analyzes a "moving time window" of operational parameter data from PCS 110. In various embodiments, more than one operational parameter can be simultaneously acquired and analyzed. For example, in some embodiments microcontroller 125 simultaneously acquires and analyzes operational data including: DC voltage and current from PV panels 105, AC voltage and current delivered to AC mains/meter 120, a switching frequency of an internal DC to AC inverter, a temperature of an integrated circuit in the DC to DC converter and/or a temperature of an ambient environment within PCS 110.

In various embodiments PCS 110 includes a first-in-first-out (FIFO) buffer that temporarily holds the moving time window of operational parameter data generated by each sensor. Once the buffer for a particular operational parameter is full, the first recorded data value (First In) is pushed out (First Out) and discarded to make room for a newly acquired data value. In this way, at any given time a "moving time window" of data is continuously stored in the buffer for each operational parameter. The number of data points, the frequency of the data points, the size of the buffer and other characteristics of each operational parameter may be adjusted as necessary. For example, for voltage, data may be recorded once per microsecond with a buffer window of 40 microseconds, while for temperature, data may be recorded once per second with a total buffer window of 10 seconds. In some embodiments, if the fault event continues for extended period of time the microcontroller can stop storing data after a predetermined period of time. In some embodiments this can be used to preserve room in the non-volatile memory.

In some embodiments one or more of the operational parameters can be used in computations performed by the microcontroller including, but not limited to, averaging, peak tracking and fast Fourier transformations (FFT's) into the frequency domain. The results of the computations can also be stored in the buffer as a moving window of data.

Process 200 proceeds to step 210 where the microcontroller uses data acquired from the PCS and/or the result of one or more computations to determine if any of the operational parameters have exceeded an associated threshold value. The threshold value can be a value that is predetermined for each operational parameter. For example, the microcontroller may acquire analog data such as a voltage from the PCS, convert it to digital data using an analog to digital converter, then, using software within the microcontroller, the digital data can be compared to a programmed threshold value. If the microcontroller determines that the operating parameter has exceeded the threshold value, it proceeds to step 215. Otherwise, it continues to acquire and analyze data associated with the moving time window of operational parameter data.

In step 215, a threshold value for at least one operational parameter has been exceeded and the microcontroller creates a fault event. In some embodiments, the creation of a fault event includes a specific set of commands for the microcontroller to perform. In various embodiments, for example, the specific set of commands can include commanding the microcontroller to: allocate additional memory for storing operational parameters in the buffer memory, record a current date and time, start acquiring additional operational parameters, notify a remote site of a fault event or any other instruction set such as collecting data after the fault event for a predetermined time period, as discussed in more detail below.

In step 220 the microcontroller determines a time period to continue acquiring the moving window of operational parameter data after the fault event. More specifically, once the fault event occurs, the microcontroller can take different actions, based on the particular fault event that occurred. In one example, the fault event may be an over voltage spike. In response, the microcontroller can determine that it should continue acquiring the moving time window of data for 40 microseconds after the fault event before the data in the buffer is transferred to the non-volatile memory. In another example, the fault event may be an over temperature condition within the power control system and the microcontroller can allocate additional space in the buffer memory, start acquiring data from additional temperature sensors, and continue acquiring the moving window of data for a time period of five minutes after the fault event. Therefore, the data stored in the buffer (i.e., the moving window of operational parameter data) includes data for a certain time before the threshold value was exceeded, data during the time the threshold value was exceeded and data for a time period after the threshold value was exceeded.

In some embodiments this data can include header information documenting the time, date and other parameters of the particular data points. In further embodiments the creation of a fault event can command the microcontroller to increase its frequency/sampling of acquiring data and/or command it to record additional operating parameters. The creation of the fault event can also command the microcontroller to automatically send data to a remote analysis location once the required data has been collected.

In step 225 the moving window of data in the buffer is stored in a non-volatile memory. In some embodiments, the buffer and the non-volatile memory may be fabricated on the same die/chip, while in other embodiments the non-volatile memory may be a separate memory device within the microcontroller. In further embodiments, the non-volatile memory may be a separate electronic component or die/chip from the microcontroller. The data stored in the non-volatile memory can be recalled, downloaded and/or accessed remotely or by directly by accessing the memory device itself. The data can also be automatically transferred to a remote site (e.g., cloud based storage) on a routine basis and/or upon the occurrence of a fault event. After the operational parameter data is stored in the non-volatile memory, the process proceeds back to step 205 and continues acquiring and analyzing the moving time window of data.

During the acquisition and storage of data, the microcontroller and non-volatile memory may be powered by the PCS, including one or more backup power sources. In some embodiments, as soon as a fault event is created, the microcontroller can be programmed to receive power from one or more backup "auxiliary" power sources so it does not lose power if the PCS fails, as discussed in more detail below.

Figure 3:
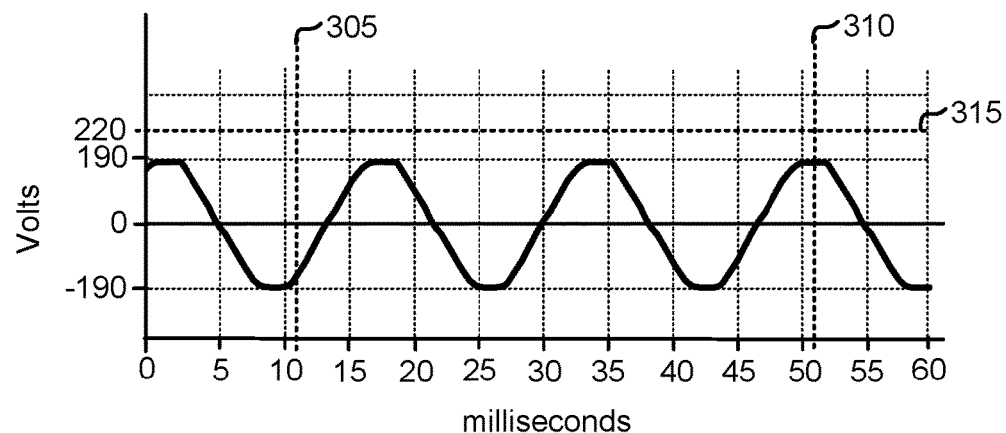
FIG. 3 is a graph illustrating an example of an operational parameter that can be generated by the power control system shown in FIG. 1.

Now referring to FIG. 3, this figure shows a graph of one exemplary operational parameter with a threshold value and a moving time window. Process 200 (FIG. 2) of operating a microcontroller to detect a fault will be referred to simultaneously. In this example, the data that is being acquired by the microcontroller is an AC output voltage of the PCS that is delivered to AC mains/meter 120. The AC voltage varies sinusoidally between approximately +190 V and −190 V for a 120V AC RMS voltage. Starting at step 205 in FIG. 2, the "time window" of data that is acquired and analyzed in this example starts at line 305 at a time of approximately 12 milliseconds and ends at line 310 at a time of approximately 52 milliseconds. Thus, the data that is temporarily stored in the buffer at this instant in time is between 12 and 52 milliseconds representing a "time window" of approximately 40 milliseconds of data. The data from 0 milliseconds to 12 milliseconds has been discarded from the buffer. As time moves forward, new data at 53 milliseconds will be acquired and analyzed and data at 13 milliseconds will be discarded from the buffer. As discussed above, any type of analysis can be performed on the data, including a moving average that can use a portion or all the data that exists in the buffer. The data sample rate can be varied, for example a data sample may be taken every 1 milliseconds in the above case.

Now referring to step 210 of FIG. 2, the microcontroller determines if a threshold value has been exceeded. In this example the threshold value is represented by line 315 at approximately +220 VAC. Thus, in this example, the threshold value has not been exceeded so data flows into and out of the buffer without being recorded in the non-volatile memory. Referring to process 200 in FIG. 2, the process returns back to step 205 where it continues acquiring and analyzing a moving window of operational parameter data.

Figure 4:
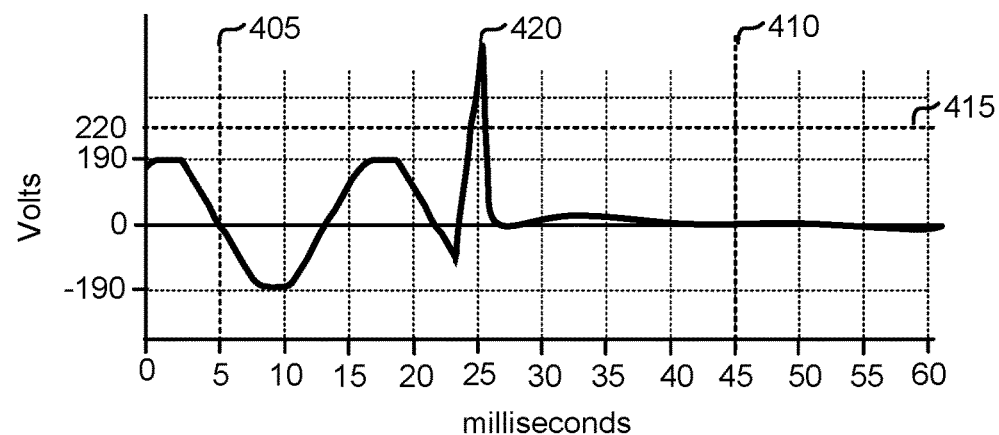
FIG. 4 is a graph illustrating an example of an operational parameter generated by the power control system shown in FIG. 1 that exceeds a threshold value.

Now referring to FIG. 4, the same sinusoidally varying voltage that is being delivered to AC mains 120 illustrated in FIG. 3 is shown, however in this figure, a voltage spike identified at point 420 occurs at approximately 25 milliseconds. This spike exceeds threshold voltage line 415 set at approximately +220 VAC. Therefore, in this example, in process 200, at step 210, because a threshold value is exceeded, the process proceeds to step 215 where a fault event is created.

As discussed above, creating a fault event can include the microcontroller performing a set of instructions such as, for example, continuing to record data for a predetermined time after the fault event, commanding the microcontroller to allocate additional memory for the data buffer, recording a current date and time, acquiring additional operational parameters or any other instruction.

Proceeding to step 220 of process 200 in FIG. 2, in the exemplary graph shown in FIG. 4, the microcontroller is commanded to continue collecting data after the fault event for another 20 milliseconds to line 410. Data from line 405 at approximately 5 milliseconds already exists in the buffer so that after the microcontroller records data for the additional 20 milliseconds, the moving time window of data will span a total of 40 milliseconds, including 20 milliseconds of data before the fault event and 20 milliseconds of data after the fault event.

Proceeding to step 225 of process 200 in FIG. 2, at the end of the time period (represented by line 410) the data within data window is transferred from the buffer and stored within the non-volatile memory. As discussed above, in some embodiments, the microcontroller may perform real-time computations on the data and the real-time results of the computations stored in the buffer can also be transferred to the non-volatile memory. In some embodiments, all of the data from a particular fault event can be saved in an "event log" that notes the time and the date of the event so it can be distinguished from other previous or subsequent event logs that are stored in the same non-volatile memory.

After the data in the event log is recorded, the microcontroller then proceeds back to step 205 of process 200 in FIG. 2, where it continues acquiring and analyzing a moving time window of operational parameter data. The examples in FIGS. 3-4 illustrate one method of acquiring and analyzing data from PCS 110. Numerous other methods that acquire and analyze other operational parameters and different configurations of threshold levels may be used without departing from the scope of this disclosure.

Figure 5:
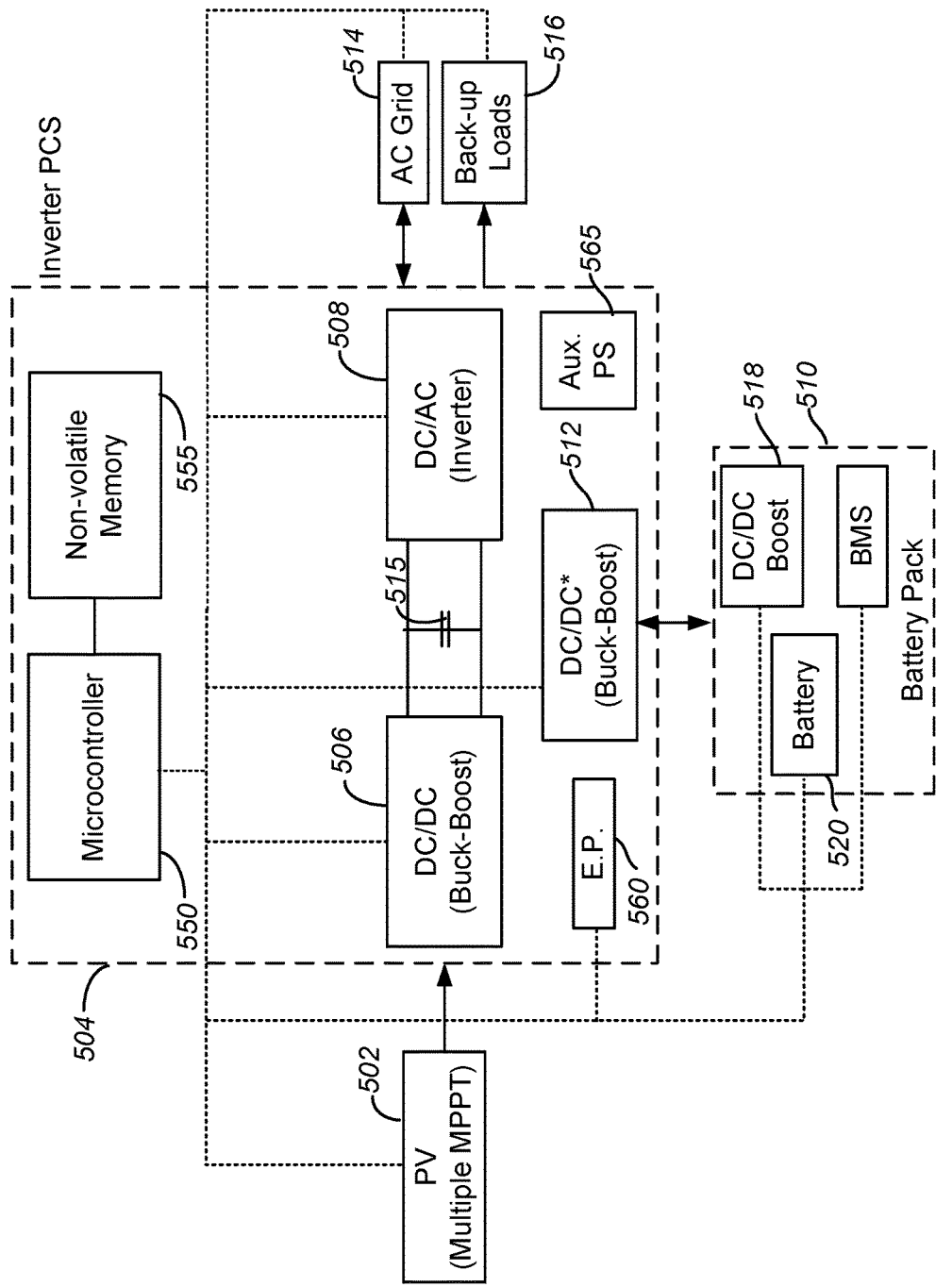
FIG. 5 is a simplified schematic of a power control system and ancillary systems according to an embodiment of the disclosure.

Now referring to FIG. 5, a more detailed schematic of an exemplary PCS 504 for a PV system that includes a microcontroller data acquisition, analysis and storage system according to various embodiments of the invention is shown. This is just one example of a PV PCS and this disclosure shall not be limited to only this circuit. It is understood that the acquisition, analysis and recording of PV PCS data disclosed herein are applicable to any PV PCS system or any other electronic system.

As illustrated in FIG. 5, photovoltaic (PV) strings 502 are input to PCS 504. Each string may comprise a plurality of PV panels (not shown) connected serially with an additive direct current (DC) voltage somewhere between 10 and 2000 volts, depending on such factors as the number of panels, their efficiency, their output rating, ambient temperature and irradiation on each panel.

In some embodiments, when the high voltage DC line from each string is input to PCS 504, it is subject to maximum power-point tracking (MPPT) at the string level. Alternatively, each module, or a number of individual modules in the respective strings, may include a DC optimizer that performs MPPT at the module level or N-module level output, rather than at the string level. The various embodiments are compatible with either centralized or distributed MPPT.

In some embodiments, PCS 504 may include a DC/DC conversion stage 506 at the PV input side. DC/DC stage 506 may be employed to insure that the voltage supplied to DC/AC stage 508 is sufficiently high for inversion. PCS 504 also includes a DC link bus attached to a battery pack 510 so that the DC power coming from the strings can be used to deliver DC power to charge/discharge battery pack 510. The DC link bus is represented by capacitor bank 515 shown between DC-DC converter 506 and DC-AC inverter 508. Battery pack 510 can have a minimum and maximum associated operating voltage window. Because battery pack 510 has a maximum exposed input voltage limit that, in many cases, is equal or lower than the theoretical maximum DC voltage coming off of the strings (open circuit voltage, $V_{on}$), various embodiments of the invention include a buck-boost circuit 512 between the string-level PV input of PCS 504 and the DC-link connection to the battery pack. The inclusion of buck-boost circuit 512 can prevent voltages above a safe threshold from being exposed to battery pack 510 thereby eliminating the possibility of damage to battery pack 510 from overvoltage stress.

It should be appreciated that PCS 504 may have more than one mode of operation. In some modes, no power may be flowing from PV strings 502 to battery pack 510, while in other modes power may be flowing exclusively to battery pack 510, while in still further modes power may be flowing to a combination of the battery pack and the AC grid or back-up loads. In a first mode, all available PV power may go to battery pack 510 as a priority, with any surplus power going to DC/AC stage 508 of PCS 504 to be supplied to AC grid 514 or delivered to back-up loads 516. In a second mode, all generated power may be supplied to DC/AC stage 508 and either used to power back-up loads 516 or supplied to AC grid 514. In yet other modes, battery pack 510 may be discharged to DC/AC stage 508 alone and/or with PV power from strings 502 to supply power to AC grid 514 and/or back-up loads 516. In a further mode, power may come from AC grid 514, through DC/AC stage 508 to charge battery pack 510, for example, at a time when PV array 502 is not generating power and demand for power is at its lowest point (e.g., at night). In various embodiments, the selection of a mode may be controlled by logic in battery pack 510, in PCS 504, or in both, or selection could be based on commands or signals from an external source.

With continued reference to the exemplary solar energy generation system of FIG. 5, there are two blocks 506/512 labeled "DC/DC (Buck-Boost)". These blocks 506/512 represent alternative embodiments. In the first embodiment, the buck-boost circuit is located in the DC-link at the front end of PCS 504 (as depicted by block 506) so that the DC input(s) coming from PV strings 502 are always subject to buck or boost, keeping the voltage at DC link bus sufficiently high for inversion while also preventing too high of a voltage from being presented to battery pack 510. In this embodiment, there is no need for a second buck-boost circuit anywhere else. In the second embodiment, the buck-boost circuit is located between the DC link bus of PCS 504 and battery pack 510 (as depicted by block 512) such that the high voltage DC inputs from strings 502 only go through the buck-boost whenever voltage is exposed to battery pack 510. In this alternative embodiment, there may be an additional DC-DC boost stage at the input to PCS 504 but no need for a second buck circuit anywhere else. Either embodiment will prevent battery pack 510 from being exposed to excessively high voltages generated by the PV array. The voltage from PV strings 502 could be as high as 600 Volts, or even 1000 Volts in the case of a 1 kV PV system.

It should be appreciated that battery pack 510 can be an exemplary commercially available residential lithium-ion battery pack with its own battery 520 only or battery 520 with DC/DC boost converter 518 or other topologies. Alternatively, battery 520 may be a lead acid battery, advanced lead acid battery, flow battery, organic battery, or other battery type. The various embodiments disclosed herein are compatible with numerous different battery chemistries. Various disclosed embodiments will work with other commercially available battery packs as well, however, the embodiments may have particular utility for systems that use high voltage battery packs (e.g., >48 volts) such as 480V-1000V battery packs. As depicted by the dashed line boxing each of PCS 504 and battery pack 510, PCS 504 and battery pack 510 may be housed in a wall-mounted housing located inside or outside of a residence or a commercial building. Alternatively, battery pack 510 and inverter PCS 504 may be located in separate housings.

As further illustrated in FIG. 5, microcontroller 550 can be coupled to any of the subcircuits within PCS 504 and/or battery pack 510 so it can acquire, analyze and store data in non-volatile memory 555. Further, microcontroller 550 can also be configured to acquire, analyze and store one or more environmental parameters 560 within PCS 504 and/or battery pack 510. Environmental parameters 560 can include any environmental parameters within PCS 504 or outside of the PCS. For example, environmental parameters 560 can include internal component temperatures, internal air temperatures, internal air velocity, external air temperature, external air velocity. Environmental parameters within battery box 510 can also be acquired.

In some embodiments, microcontroller 550, non-volatile memory 555 and other circuits can be powered by an auxiliary power supply 565. In various embodiments, auxiliary power supply 565 can receive power from PV Panels 502, and can also be configured to receive power from backup power sources if one or more components of the system fail, as discussed in more detail below.

Now referring to FIGS. 6-12, examples of operational parameters acquired from subcircuits discussed in FIG. 5 are shown. The operational parameter data are analyzed to determine if any of them exceed associated threshold values and if any one of them does, a fault event is created and operational parameter data before, during and after the fault event is stored in the non-volatile memory.

Figure 6A:
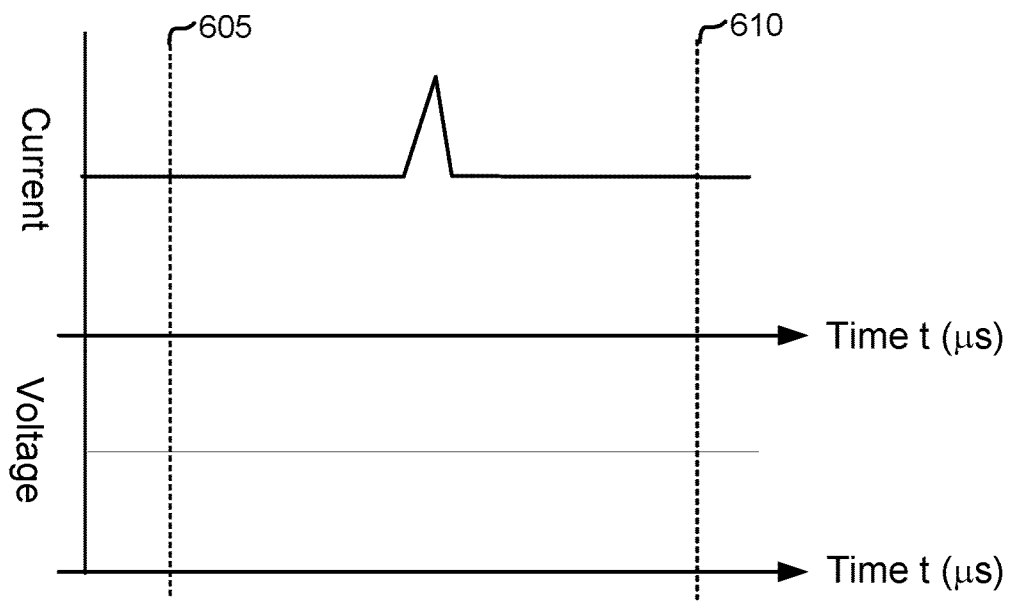
FIG. 6A is a graph of a waveform showing an arc fault event according to an embodiment of the disclosure.
Figure 6B:
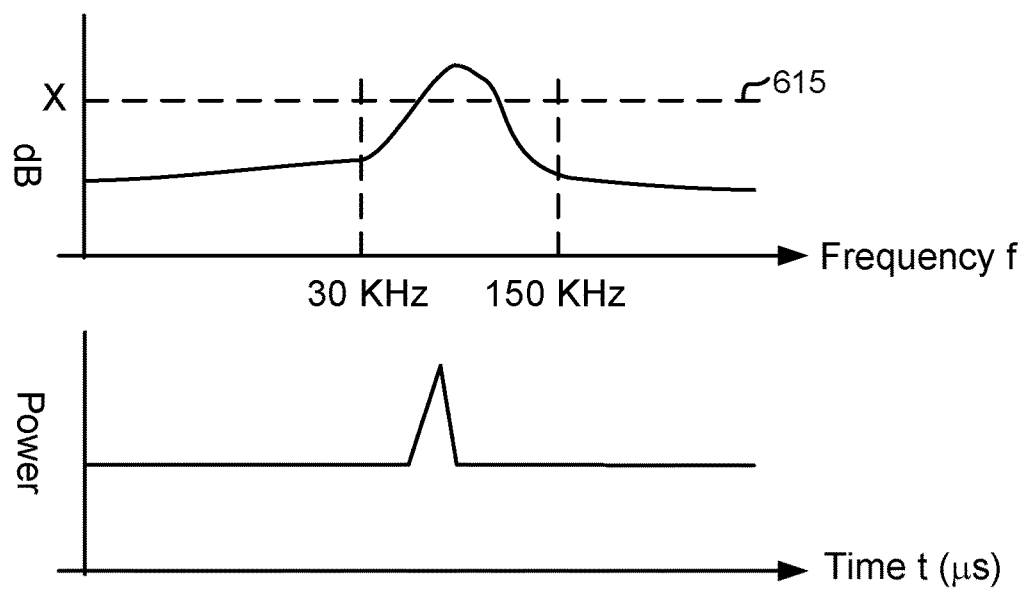
FIG. 6B is a graph of the frequency-noise spectrum of the waveform in FIG. 6A.

Now referring to FIGS. 6A and 6B, an example of acquiring data from PCS 504 and using a threshold value to detect an series arc-fault event is illustrated. In this example, current and voltage can be monitored within PCS 504 using one or more sense circuits, discussed in more detail below. The current and voltage can be measured at any location within PCS 504 to detect a potentially harmful electrical connection. For example, monitoring can be performed at the input of DC/DC converter 506. The arc-fault detection distinguishes between a harmless arc that occurs incidental to normal operation of switches, plugs, and brushed motors, and an undesirable arc that can occur, for example, in a circuit-to-circuit connector that has a broken conductor. To distinguish between harmful and harmless arcs, the microcontroller can be equipped with a fast Fourier transform algorithm (FFT) to convert the current waveform of FIG. 6A into the frequency domain for noise measurement. In some embodiments, a relatively large spike of noise (measured in dB) that occurs at frequencies between 30 kHz to 150 kHz or higher can be indicative of an undesirable (harmful) arc and used to set a threshold level for identifying a fault event.

Now, referring specifically to FIG. 6A, the microcontroller can acquire and record both current and voltage data in a buffer for a particular circuit between start line 605 and stop line 610, creating a "time window" of data. As illustrated in FIG. 6B, in some embodiments the microcontroller continuously performs a FFT analysis of the data in the buffer creating a real-time frequency domain graph of the FFT data in the buffer. A predetermined threshold level 615 can be set so if at any time the frequencies between 30 kHz to 150 kHz increase to the threshold level, a fault event is created. In further embodiments, the microcontroller can also calculate power value by multiplying the acquired voltage value with the acquired current value. The power data can also be recorded in the buffer. If a fault event is created, all the data above can be collected for an additional predetermined period of time before all the data is transferred to the non-volatile memory.

In some embodiments, the microcontroller can be configured to discern a true arc fault condition from a false one. In some embodiments, one of the DC-to-DC converters discussed in FIG. 5 may be configured to operate between 1 kHz and 1 MHz. The noise from the DC-to-DC converter may be recognized as an arc fault causing PCS 504 to shut down. In some embodiments, the microcontroller can be configured to determine if the arc fault event was due to switching noise or due to an arc fault and if it was due to switching noise to allow a remote system to acquire the data and enable a remote restart of the PV system. More specifically, in some embodiments, the FFT data acquired by the microcontroller allows an automated system and/or an operator to determine that the shutdown was due to particular frequencies used by the DC-to-DC converter and not due to a hazardous circuit condition.

Figure 7A:
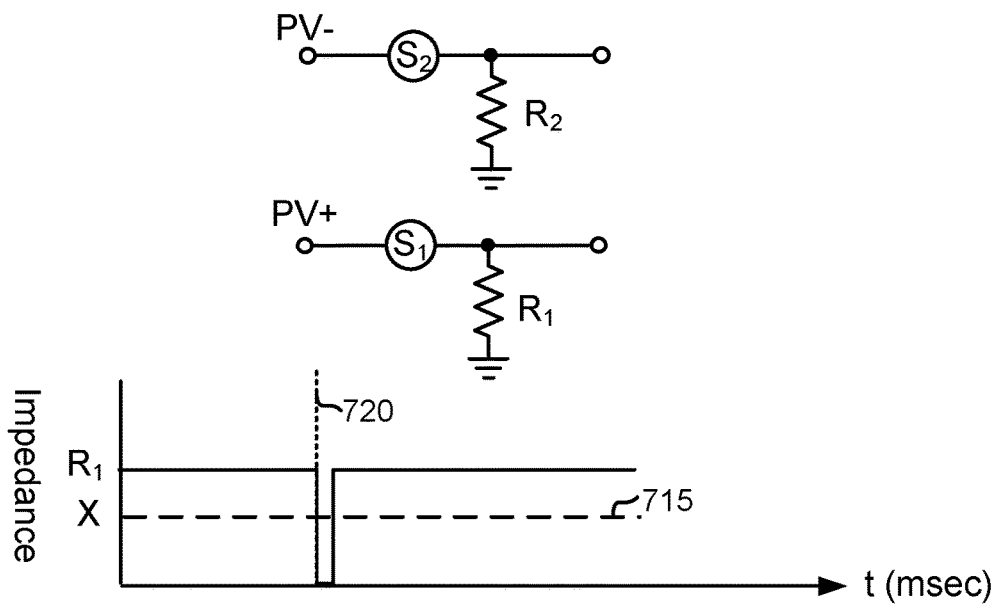
FIG. 7A is a graph of a waveform showing a ground fault event according to an embodiment of the disclosure.
Figure 7B:
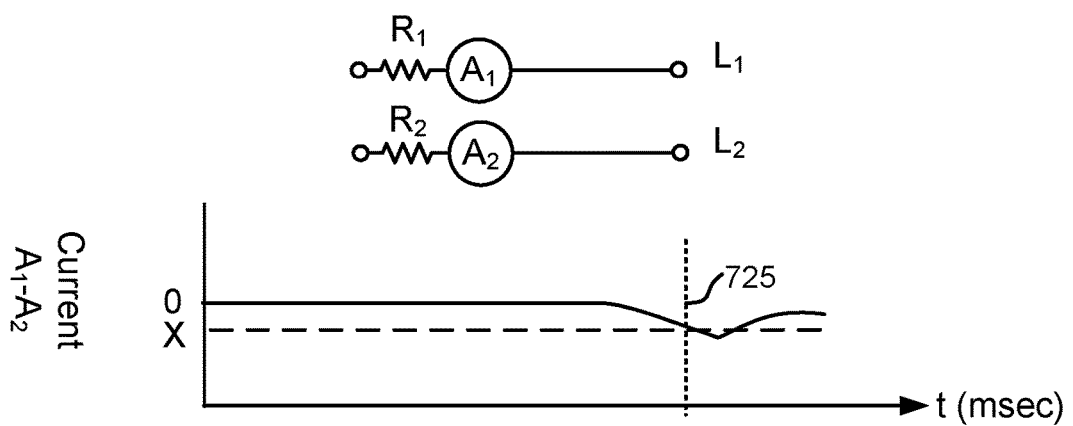
FIG. 7B is graph of a waveform showing a current imbalance ground fault event according to an embodiment of the disclosure.

Now referring to FIGS. 7A-7B an example of acquiring data from PCS, such as PCS 504 illustrated in FIG. 5, and using a threshold value to detect a ground-fault is illustrated. In this example, the microcontroller collects impedance and current data from the PV side (DC side) and the AC side, respectively, of the PCS to detect a ground fault. Other circuits and methods of detecting ground faults are within the scope of this disclosure.

In FIG. 7A, two DC power lines coming from PV input 502 (FIG. 5) are labeled as PV+ and PV− since this example illustrates a floating array. Each line has a switch $S_1$ and $S_2$ that is configured to periodically switch in resistors $R_1$ and $R_2$, respectively, to measure an impedance to ground for the respective power line. In some embodiments, the switches can be mechanical relays while in other embodiments they can be solid-state devices. The microcontroller acquires the impedance data using a "data window" and analyzes it, as discussed above. In some embodiments, the microcontroller analyzes the impedance of $R_1$ as shown in the graph and monitors it as compared to a threshold level 715. In the illustrated example, at time 720 a threshold value "X" is exceeded and the microcontroller creates a fault event and transfers data to the non-volatile memory.

FIG. 7B illustrates a first AC power line L1 and a second AC power line L2 of an AC output of the PCS from DC/AC inverter 508 (FIG. 5) to AC grid 514. In this embodiment, A1 and A2 represent current meters for L1 and L2, respectively. As illustrated in the graph of FIG. 7D, in some embodiments, the microcontroller can be configured to monitor the difference between currents A1 and A2. If the current between A1 and A2 is balanced (i.e., 0 amps) then there is not a ground fault on either line. However, as illustrated in FIG. 7B, at time 725, any mismatch in current greater than a threshold level "X" is registered as a ground fault resulting in the microcontroller creating a fault event and transferring data to the non-volatile memory.

Figure 8:
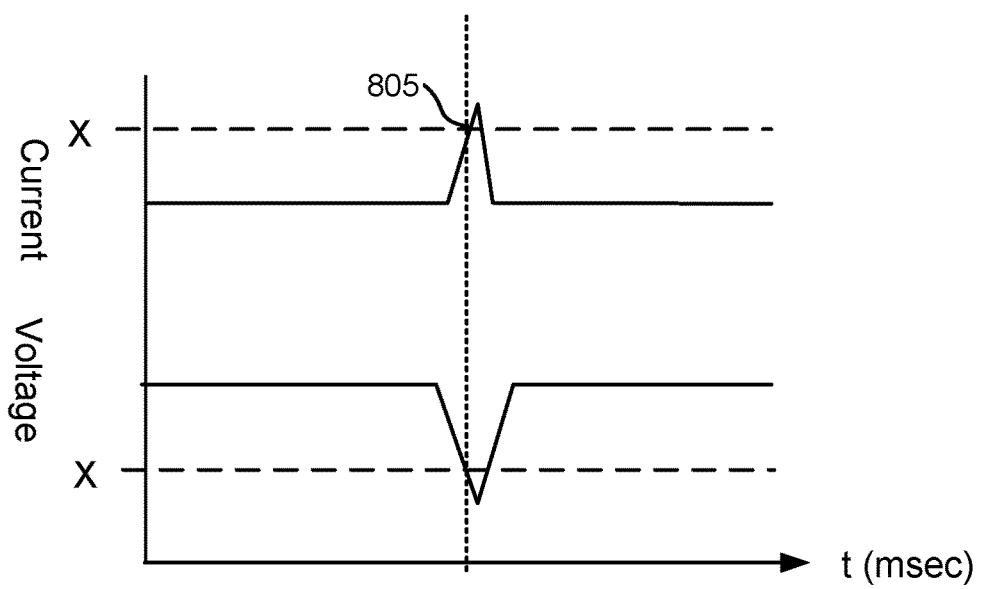
FIG. 8 is a graph of a waveform showing an overcurrent condition according to an embodiment of the disclosure.

Now referring to FIG. 8, a short circuit on the AC side is detected by monitoring current and voltage on an AC power line of the AC output of the PCS from DC/AC inverter 508 (FIG. 5) to AC grid 514. The microcontroller acquires the current and voltage data using a "time window" of data and analyzes it, as discussed above. In some embodiments, the microcontroller computes an output power by multiplying the voltage times the current and also monitors this data. In the example illustrated in FIG. 8, at time 805 a threshold value "X" of current and voltage are exceeded and the microcontroller creates a fault event and transfers data to the non-volatile memory.

Figure 9:
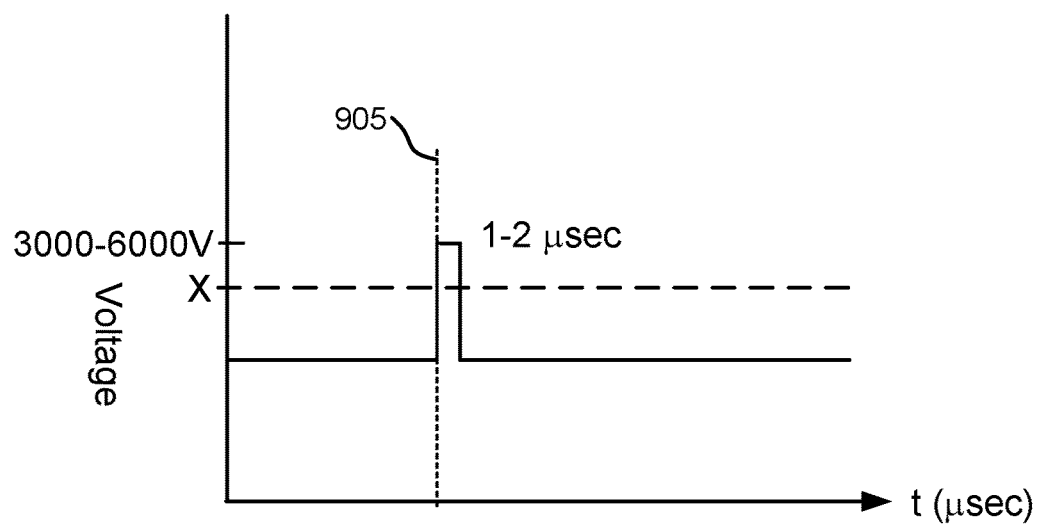
FIG. 9 is a graph of a waveform showing a grid surge condition according to an embodiment of the disclosure.

Now referring to FIG. 9, an AC grid voltage surge is detected by monitoring voltage on an AC power line of the AC output of the PCS from DC/AC inverter 508 (FIG. 5) to AC grid 514. The microcontroller acquires the voltage data using a "time window" of data and analyzes it, as discussed above. In the example shown in FIG. 9, at time 905, a threshold voltage is exceeded to a level of approximately 3000-6000 volts for a time period of approximately 1-2 microseconds. The microcontroller creates a fault event and transfers data to the non-volatile memory. In some embodiments, both the threshold voltage as well as a time that the voltage exceeds the threshold voltage can be analyzed by the microcontroller to create the fault event.

Figure 10:
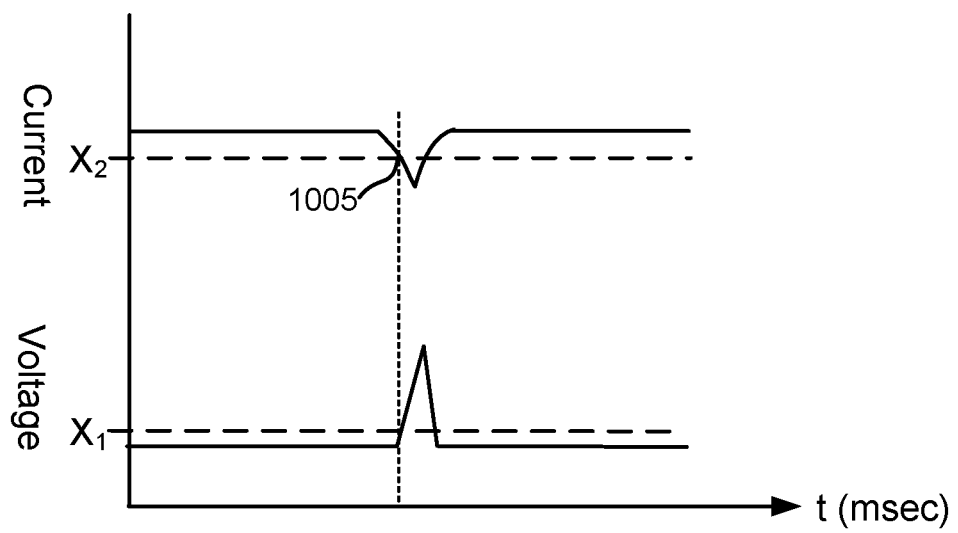
FIG. 10 is a graph of a waveform showing an overvoltage condition according to an embodiment of the disclosure.

Now referring to FIG. 10, a battery output overvoltage condition is detected by monitoring voltage and current on the output of a battery pack such as battery pack 510 in FIG. 5. The microcontroller acquires the battery pack output voltage and output current data using a "time window" of data and analyzes it, as discussed above. In the example illustrated in FIG. 10, at time 1005 a threshold value of voltage and current are exceeded. The microcontroller creates a fault event and transfers data to the non-volatile memory.

Figure 11:
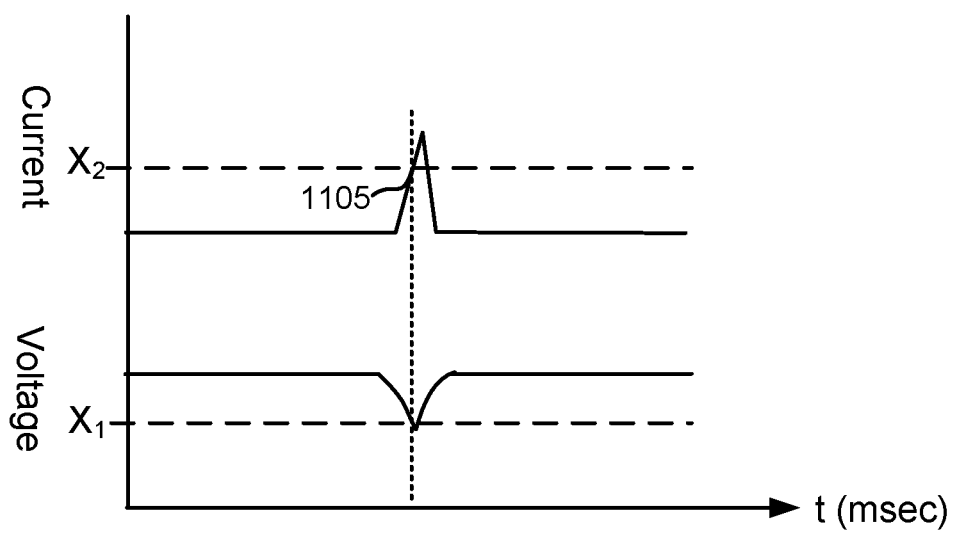
FIG. 11 is a graph of a waveform showing an overcurrent condition according to an embodiment of the disclosure.

Now referring to FIG. 11, a battery output overcurrent condition is detected by monitoring voltage and current on the output of a battery pack such as battery pack 510 in FIG. 5. The microcontroller acquires the battery pack output voltage and output current data using a "time window" of data and analyzes it, as discussed above. In the example illustrated in FIG. 11, at time 1105, a threshold value of voltage and current are exceeded. The microcontroller creates a fault event and transfers the corresponding data to the non-volatile memory.

Figure 12:
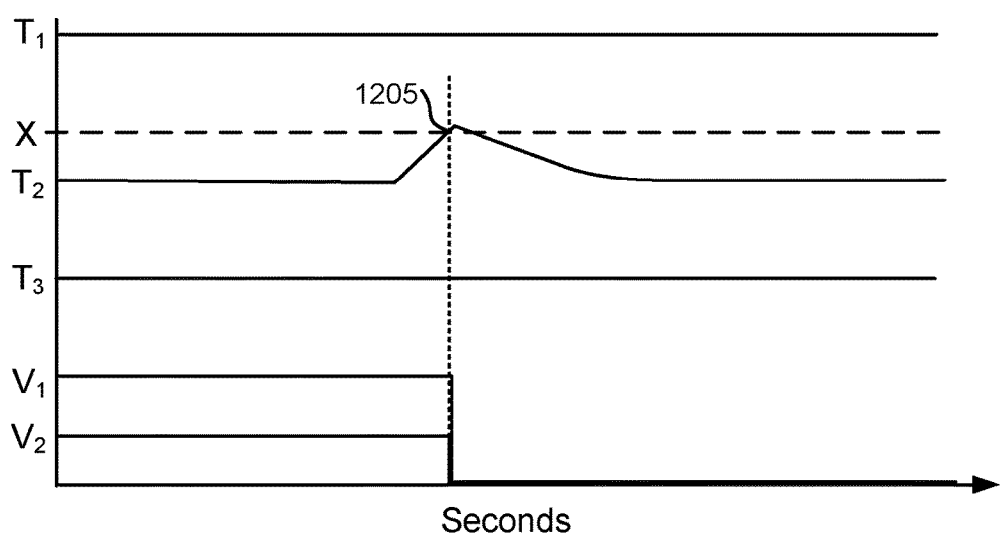
FIG. 12 is a graph of a waveform showing an over temperature condition according to an embodiment of the disclosure.

Now referring to FIG. 12, three environmental parameters (e.g., Temperature $T_1$, Temperature $T_2$ and Temperature $T_3$) and two voltages (e.g., voltage $V_1$ and voltage $V_2$) are acquired within PCS 504 (FIG. 5) by the microcontroller. The microcontroller temporarily stores the temperature and voltage data in a buffer using a "time window" of data and analyzes it, as discussed above. In the example shown in FIG. 12, at time 1205, a threshold value of temperature at $T_2$ has been exceeded. At a similar time, voltages V1 and V2 transition to 0 volts either due to a failure in the PCS or due to an automatic shutdown sequence to protect the PCS. The microcontroller creates a fault event when the threshold value has been exceed and transfers the "time window" of temperature and voltage data to the non-volatile memory.

Figure 13:
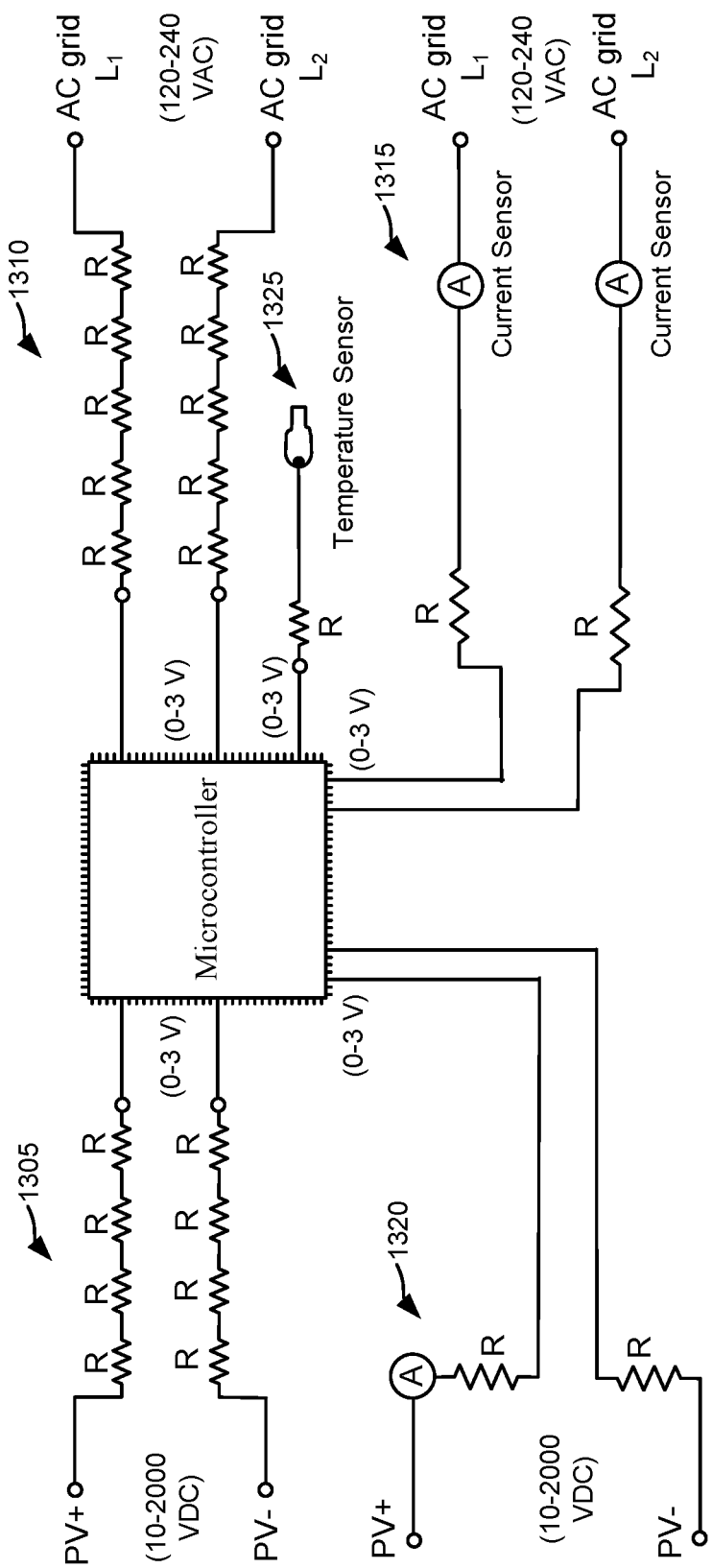
FIG. 13 illustrates example sensor circuits that can be used to acquire data from one or more circuits according to an embodiment of the disclosure.

Now referring to FIG. 13, several exemplary sensor circuits are shown that can be used to couple a microcontroller to different circuits within the PCS to acquire data. In some embodiments, the microcontroller is configured to accept a limited voltage on its input terminals. In various embodiments, the microcontroller can accommodate voltages between 0-3 volts, thus when it is coupled to circuits that have higher voltages, voltage scaling circuits can be used. As used herein, sensors and sensor circuits can be any circuit that enables the microcontroller to acquire operational parameter data from the PCS.

Circuits 1305 and 1310 illustrate exemplary voltage scaling circuits. Circuit 1305 illustrates a voltage scaling circuit for coupling the microcontroller to the PV output, and circuit 1310 illustrates a voltage scaling circuit for coupling the microcontroller to the AC grid. By using an appropriate resistor, or combination of resistors, both DC and AC voltages can be scaled to provide the appropriate level of voltage input to the microcontroller.

To measure current, a current sensor having the appropriate scaling can be used, or, alternatively, the sensor can be used in combination with a resistor as discussed above and illustrated by circuits 1315 and 1320. To measure temperature, a thermistor, a resistance temperature diode or a thermocouple can be used as shown in circuit 1325 of FIG. 13. Myriad sensors and scaling circuits can be used to couple the microcontroller to circuits and are within the scope of this disclosure. In some embodiments, a transformer, an optical isolator or other protective device can be used in between the microcontroller and the circuit to protect the microcontroller from being harmed by the circuit.

Figure 14:
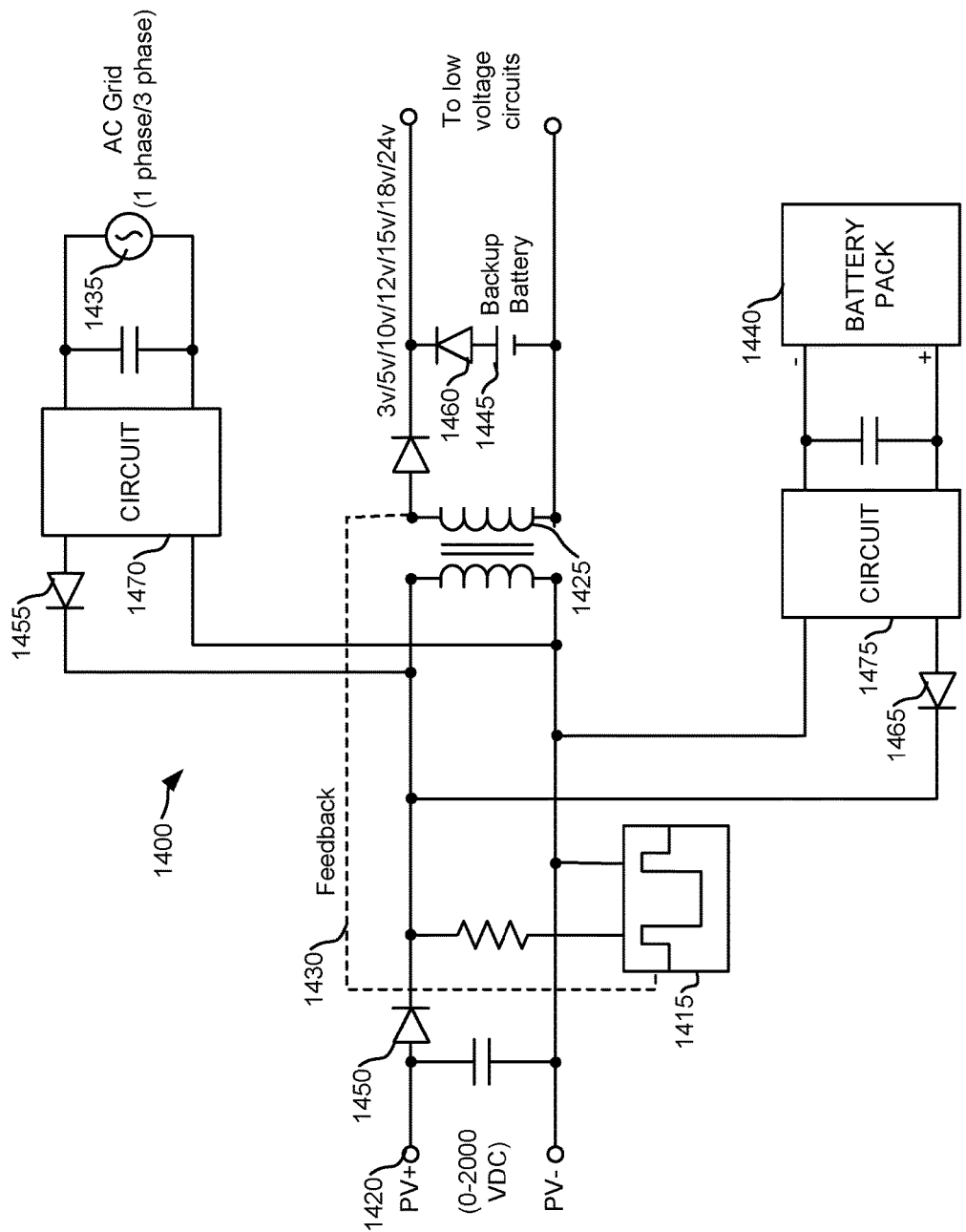
FIG. 14 is an example of backup auxiliary power sources supplying a microcontroller with power according to an embodiment of the disclosure.

Now referring to FIG. 14, an exemplary auxiliary power supply circuit 1400 that may be used as circuit 505 in FIG. 5 is shown. Primary power for the microcontroller and the non-volatile memory can be supplied by low power DC/DC fly back converter 1415 that feeds off PV panel DC output 1420, that can be in the range of 0-2000 VDC. DC/DC converter 1415 can be coupled to the microcontroller through transformer 1425 that can supply one or more DC voltages to the microcontroller. In one example, transformer 1425 supplies any of 3V, 5V, 10V, 12V, 15V, 18V and 24V to microcontroller 1410. Feedback circuit 1430 can be used to regulate DC/DC converter 1415.

If the PV panel stops supplying power, backup power can be supplied from AC Grid 1435, battery pack 1440, or backup battery 1445. In some embodiments, one or more diodes 1450, 1455, 1460, 1465 can be configured such that the backup power sources are sequentially employed. In one example, the PV panels are the primary power source for DC/DC converter 1415. Then, if they fail, AC Grid 1435 supplies power, and if the AC Grid fails, battery pack 1440 supplies power, and finally, if the battery pack fails, backup battery 1445 supplies power. In some embodiments, whichever power source has a greater voltage will supply the power to DC/DC converter 1415. In various embodiments, circuit 1470 can be an AC to DC converter, and circuit 1475 can be a DC-to-DC converter.

Figure 15A:
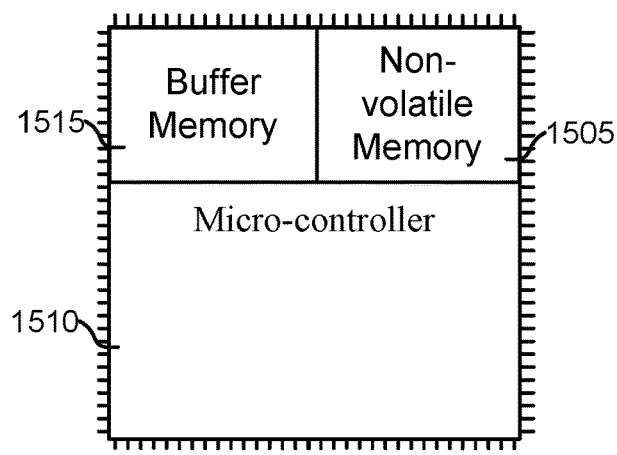
FIG. 15A is an example of a microcontroller and a non-volatile memory according to an embodiment of the disclosure.
Figure 15B:
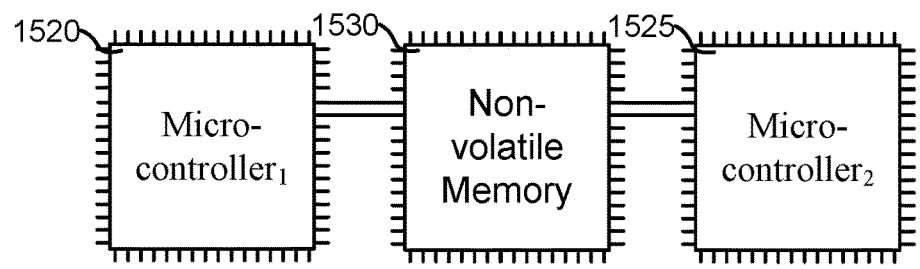
FIG. 15B is an example of two microcontrollers coupled in parallel to a non-volatile memory according to an embodiment of the disclosure.
Figure 15C:
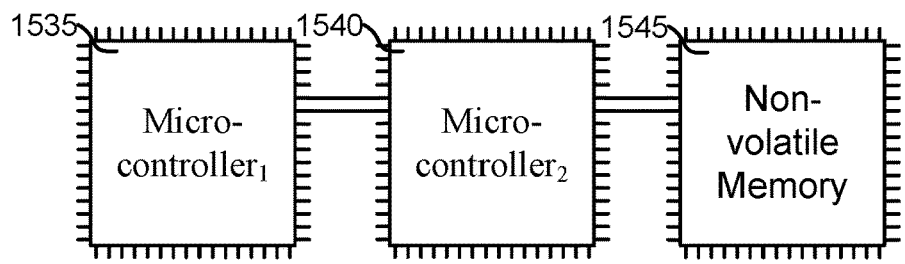
FIG. 15C is an example of two microcontroller coupled in series to a non-volatile memory according to an embodiment of the disclosure.

Now referring to FIGS. 15A-15C, three exemplary architectures of microcontrollers and non-volatile memories are illustrated. In a first embodiment, illustrated in FIG. 15A, non-volatile memory 1505 is disposed within the same electronic device as microcontroller 1510 and buffer memory 1515. In some embodiments, microcontroller 1510, buffer memory 1515 and non-volatile memory 1505 may be monolithically integrated on the same die, while in other embodiments, non-volatile memory 1505 can be co-packaged with microcontroller 1510 and buffer memory 1515. As described herein, non-volatile memory 1505 is used for relatively long-term storage of data for later recall, while buffer memory 1515 is used for relatively short-term transient storage of data.

In a second embodiment illustrated in FIG. 15B, first microcontroller 1520 and second microcontroller 1525 are connected in parallel to non-volatile memory 1530. Either microcontroller 1525, 1530 can independently transfer information to and from memory 1530. In a third embodiment illustrated in FIG. 15C, first microcontroller 1535 and second microcontroller 1540 are connected in series to non-volatile memory 1545. That is, for first microcontroller 1535 to transfer data to and from non-volatile memory 1545, it transfers the data through second microcontroller 1540. In other embodiments, additional microcontrollers and additional non-volatile memories can be used and interconnected with one another without departing from this disclosure.

A microcontroller may be a small computer that can be formed on a single integrated circuit containing a processor core, memory, and programmable input/output peripherals. Program memory in the form of Ferroelectric RAM, NOR flash or OTP ROM can be included on the chip, as well as a typically small amount of RAM. The microcontroller can be programmed using myriad languages known in the art.

In some embodiments the microcontroller can contain from several to dozens of general-purpose input/output pins (GPIO). GPIO pins are software configurable to either an input or an output state; when the GPIO pins are configured to an input state, they can be used to read sensors or external signals; when they are configured to the output state, GPIO pins can drive external devices such as LEDs or motors, indirectly, through external power electronics.

In some embodiments, microcontrollers can include embedded systems to read sensors that produce analog signals. In various embodiments, they contain one or more analog-to-digital converters (ADC) used to convert the incoming data into a digital form that the processor can recognize. Some embodiments can also contain a digital-to-analog converter (DAC) that allows the processor to output analog signals or voltage levels. In addition to including converters, some embodiments of microcontrollers can include one or more timers. In various embodiments, a Programmable Interval Timer (PIT) is included that can either count down from some value to zero, or up to the capacity of the count register, overflowing to zero. Once it reaches zero, it sends an interrupt to the processor indicating that it has finished counting. Further embodiments can included a dedicated Pulse Width Modulation (PWM) block that allows the CPU to control power converters, resistive loads, motors, etc., without using significant CPU resources in tight timer loops.

In further embodiments, the microcontroller can also include a Universal Asynchronous Receiver/Transmitter (UART) block that receives and transmits data over a serial line with very little load on the CPU. Dedicated on-chip hardware can include capabilities to communicate with other devices (chips) in digital formats such as Inter-Integrated Circuit ($I^2C$), Serial Peripheral Interface (SPI), Universal Serial Bus (USB), WIFI, Bluetooth, and Ethernet.

In some embodiments the non-volatile memory as discussed herein can be any type of memory that retains stored information even after having been power cycled (turned off and back on). Some examples of non-volatile memory include electrically erasable programmable read-only memory EEPROM, read-only memory, flash memory, ferroelectric RAM (F-RAM), Magnetoresistive RAM that stores data in magnetic storage elements called magnetic tunnel junctions (MTJ's), most types of magnetic computer storage devices (e.g. hard disk drives, floppy disks, and magnetic tape) and optical discs.

In some embodiments, the non-volatile memory is used for the task of secondary storage, or long-term persistent storage as compared to the "buffer" memory that may be within the microcontroller.

Although the power control system, microcontroller and memory (see FIG. 1) are described and illustrated as one particular system/electronic device, embodiments of the disclosure are suitable for use with a multiplicity of systems/electronic devices For simplicity, various internal components, such as the interconnections between circuits, control circuitry and other components of electronic device are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

What is claimed is:

1. A power control system for an energy generation system, the power control system comprising:
   a DC to DC converter configured to convert power generated by an energy generation source;
   a DC to AC inverter configured to convert DC power output by the DC to DC converter to AC power;
   a plurality of sensors coupled to the DC to DC converter and the DC to AC inverter, each sensor being configured to detect and generate operational parameter data associated with the operation of the power control system;
   a first-in-first-out buffer that temporarily stores a moving time window of the operational parameter data generated by each of the plurality of sensors;
   a microcontroller that acquires and analyzes the operational parameter data generated by each sensor to determine whether a fault event has occurred; and
   a non-volatile memory coupled to the microcontroller, wherein a predetermined amount of time after the microcontroller detects the fault event based on operational parameter data acquired from at least one of the plurality of first sensors, a predetermined amount of operational parameter data is transferred from the first-in-first-out buffer and stored in the non-volatile memory, the predetermined amount of operational parameter data including operational parameter data generated by at least one of the plurality of sensors before, during and after the fault event.

2. The power control system of claim 1 wherein the fault event is created when operational parameter data generated by one or more of the plurality of sensors exceeds an associated threshold value.

3. The power control system of claim 1 wherein the plurality of sensors includes two or more sensors selected from the group consisting of a current sensor, a voltage sensor and a temperature sensor.

4. The power control system of claim 1 wherein the predetermined amount operational parameter data stored in the non-volatile memory includes operational parameter data generated by two or more sensors before, during and after the fault event.

5. The power control system of claim 1 wherein the microcontroller instructs the first-in-first-out buffer to transfer data the predetermined amount of operational parameter data stored therein to the non-volatile memory.

6. The power control system of claim 1 further comprising:
   an auxiliary power supply coupled to receive power from any one of a photovoltaic array, a battery pack, and an AC grid, and to supply power to the microcontroller and the non-volatile memory; and
   a back-up battery for powering the microcontroller and the non-volatile memory when the photovoltaic array, the battery pack and the AC grid are not available to provide power to the auxiliary power supply.

7. The power control system of claim 1 wherein the DC to DC converter has input terminals adapted to be coupled to power lines on which power is generated by a photovoltaic array, the DC to AC inverter has terminals adapted to be coupled to an AC grid, and the power control system includes terminals adapted to be coupled to a battery pack, wherein the operational parameter data generated by the plurality of sensors includes voltage and current data acquired at the input terminals of the DC to DC converter, at the terminals of the DC to AC inverter, and at the terminals of the power control system that are adapted to be coupled to the battery pack.

8. The power control system of claim 1 further comprising a communication channel for transmitting the operational parameter data stored in the non-volatile memory to a remote location.

9. The power control system of claim 8 wherein the power control system is configured to receive, via the communication channel, one or more commands from the remote location, responsive to the fault event.

10. The power control system of claim 1 comprising one or more sensors coupled to a battery and AC back-up loads, each of the one or more sensors configured to detect and generate operational parameter data associated with operation of the battery and the AC back-up loads.

11. A power control system for an energy generation system, the power control system comprising:
    a DC to DC converter configured to receive DC power from at least one solar photovoltaic panel;
    a DC to AC inverter configured to receive DC power from the DC to DC converter and convert the DC power to AC power for injection into an AC mains;
    a plurality of sensors coupled to the DC to DC converter and the DC to AC inverter, each sensor being configured to detect and generate operational parameter data associated with operation of the power control system;
    a microcontroller configured to simultaneously compare operational parameter data received from each of the plurality of sensors with an associated one of a plurality of threshold values to determine whether operational parameter data generated by each of the plurality of sensors has exceed the associated threshold value;

a first-in-first-out buffer that temporarily stores a moving time window of operational parameter data generated by each of the plurality of sensors; and a non-volatile memory coupled to the first-in-first-out buffer, wherein a predetermined amount of time after the microcontroller detects that operational parameter data generated by a first sensor has exceeded an associated threshold value, the operational parameter data stored in the first-in-first-out buffer is transferred to the non-volatile memory, the operational parameter data including data generated by at least one of the plurality of sensors starting a predetermined amount of time before and ending a predetermined amount of time after the microcontroller detects that operational parameter data generated by the first sensor has exceeded an associated threshold value.

12. The power control system of claim 11 further comprising:

an auxiliary power supply coupled to receive power from any one of a photovoltaic array, a battery pack, and an AC grid, and to supply power to the microcontroller and the non-volatile memory; and a back-up battery for powering the non-volatile memory and the microcontroller when the photovoltaic array, the battery pack and the AC grid are not available to provide power to the auxiliary power supply.

13. The power control system of claim 11 wherein the power control system is configured to transmit the data transferred from the first-in-first-out buffer to the non-volatile memory to a remote location, and in response, receive one or more operational commands from the remote location.

14. The power control system of claim 11 wherein the DC to DC converter has input terminals adapted to be coupled to power lines on which power is generated by the at least one solar photovoltaic panel, the DC to AC inverter has terminals adapted to be coupled to the AC mains, and the power control system includes terminals adapted to be coupled to a battery pack, wherein the operational parameter data generated by the plurality of sensors includes voltage and current data acquired at the input terminals of the DC to DC converter, at the terminals of the DC to AC inverter, and at the terminals of the power control system that are adapted to be coupled to the battery pack.

15. A method of operating a power control system for use in an energy generation system, the method comprising:

receiving operational parameter data generated by each of a plurality of sensors coupled to a DC to DC converter and to a DC to AC inverter;

storing the operational parameter data in a first-in-first-out buffer for a predetermined period of time;

comparing the operational parameter data generated by each sensor to an associated one of a plurality of threshold values;

creating a fault event when the operational parameter data generated by a first one of the plurality of sensors exceeds its associated threshold value; and a predetermined amount of time after creating the fault event, storing in a non-volatile memory operational parameter data retrieved from the first-in-first-out buffer.

16. The method of claim 15 further comprising transmitting the operational parameter data stored in the non-volatile memory to a remote location.

17. The method of claim 16 further comprising, after transmitting the operational parameter data to a remote location, receiving a command from the remote location to reset the power control system.

* * * * *